United States Patent
Jones et al.

(10) Patent No.: US 11,028,901 B2
(45) Date of Patent: Jun. 8, 2021

(54) ROPE TENSIONING SYSTEM

(71) Applicant: Landscape Structures Inc., Delano, MN (US)

(72) Inventors: Bryant A. Jones, St. Louis Park, MN (US); Aaron Nelson, Delano, MN (US)

(73) Assignee: Landscape Structures Inc., Delano, MN (US)

( * ) Notice: Subject to any disclaimer, the term of this patent is extended or adjusted under 35 U.S.C. 154(b) by 166 days.

(21) Appl. No.: 16/409,221

(22) Filed: May 10, 2019

(65) Prior Publication Data
US 2019/0346019 A1 Nov. 14, 2019

Related U.S. Application Data

(60) Provisional application No. 62/669,469, filed on May 10, 2018.

(51) Int. Cl.
*A63B 9/00* (2006.01)
*F16G 11/12* (2006.01)
*F16G 11/02* (2006.01)

(52) U.S. Cl.
CPC ............ *F16G 11/12* (2013.01); *A63B 9/00* (2013.01); *F16G 11/02* (2013.01); *A63B 2009/002* (2013.01); *A63B 2009/006* (2013.01)

(58) Field of Classification Search
CPC . F16G 11/02; F16G 11/12; A63B 9/00; A63B 2009/002; A63B 2009/004; A63B 2009/006
See application file for complete search history.

(56) References Cited

U.S. PATENT DOCUMENTS

| | | | | |
|---|---|---|---|---|
| 2,089,857 A | * | 8/1937 | Robbins | F16G 11/048 403/369 |
| 3,100,924 A | * | 8/1963 | Trier | F16G 11/05 403/275 |
| 3,346,284 A | * | 10/1967 | Petersen | F16G 15/08 403/78 |
| 4,509,233 A | * | 4/1985 | Shaw | G02B 6/48 24/115 M |
| 4,601,506 A | * | 7/1986 | Hillson | F16G 11/02 294/74 |
| 5,325,868 A | * | 7/1994 | Kimmelstiel | A61B 17/22 600/585 |
| 6,626,610 B1 | * | 9/2003 | Seegmiller | E21D 21/008 173/176 |
| 2014/0138596 A1 | * | 5/2014 | Ross | E04F 11/1859 256/47 |
| 2018/0003202 A1 | * | 1/2018 | White | F16B 2/065 |
| 2018/0340591 A1 | * | 11/2018 | Kohler | A63B 9/00 |

* cited by examiner

*Primary Examiner* — Daniel J Wiley
(74) *Attorney, Agent, or Firm* — Wesley W. Malherek; Kelly, Holt & Christenson, PLLC

(57) ABSTRACT

A system for tensioning a rope of a play structure includes a collar coupled to the play structure. The system includes a tensioner coupled to the rope. The tensioner is coupled to the collar through a threaded connection and where a rotation of the tensioner in relation to the collar adjusts a tension in the rope.

17 Claims, 10 Drawing Sheets

ROPE TENSIONING SYSTEM

CROSS-REFERENCE TO RELATED APPLICATION

The present application is based on and claims the benefit of U.S. provisional patent application Ser. No. 62/669,469, filed May 10, 2019, the content of which is hereby incorporated by reference in its entirety.

BACKGROUND

There are a wide variety of available playground structures. Some playground structures use ropes in conjunction with structures to create a diverse play environment.

SUMMARY

A system for tensioning a rope of a play structure includes a collar coupled to the play structure. The system includes a tensioner coupled to the rope. The tensioner is coupled to the collar through a threaded connection and where a rotation of the tensioner in relation to the collar adjusts a tension in the rope.

These and various other features and advantages that characterize the claimed embodiments will become apparent upon reading the following detailed description and upon reviewing the associated drawings.

DETAILED DESCRIPTION OF ILLUSTRATIVE EMBODIMENTS

There are many considerations in building a device for playgrounds. One consideration is the device should be weather and user wear resistant. Another consideration is that the device should be usable while being vandal and theft resistant. Another consideration is that the device should require minimal maintenance. To overcome variation of manufacturing tolerances related to rope lengths, it is desirable to provide a method to tension ropes when connecting to various types of playground equipment. In addition, a normal rope does experience some expansion after wearing in and may require the rope to be further tensioned to maintain a tautness in the rope. One example system described herein fulfils these considerations.

Figure 1:
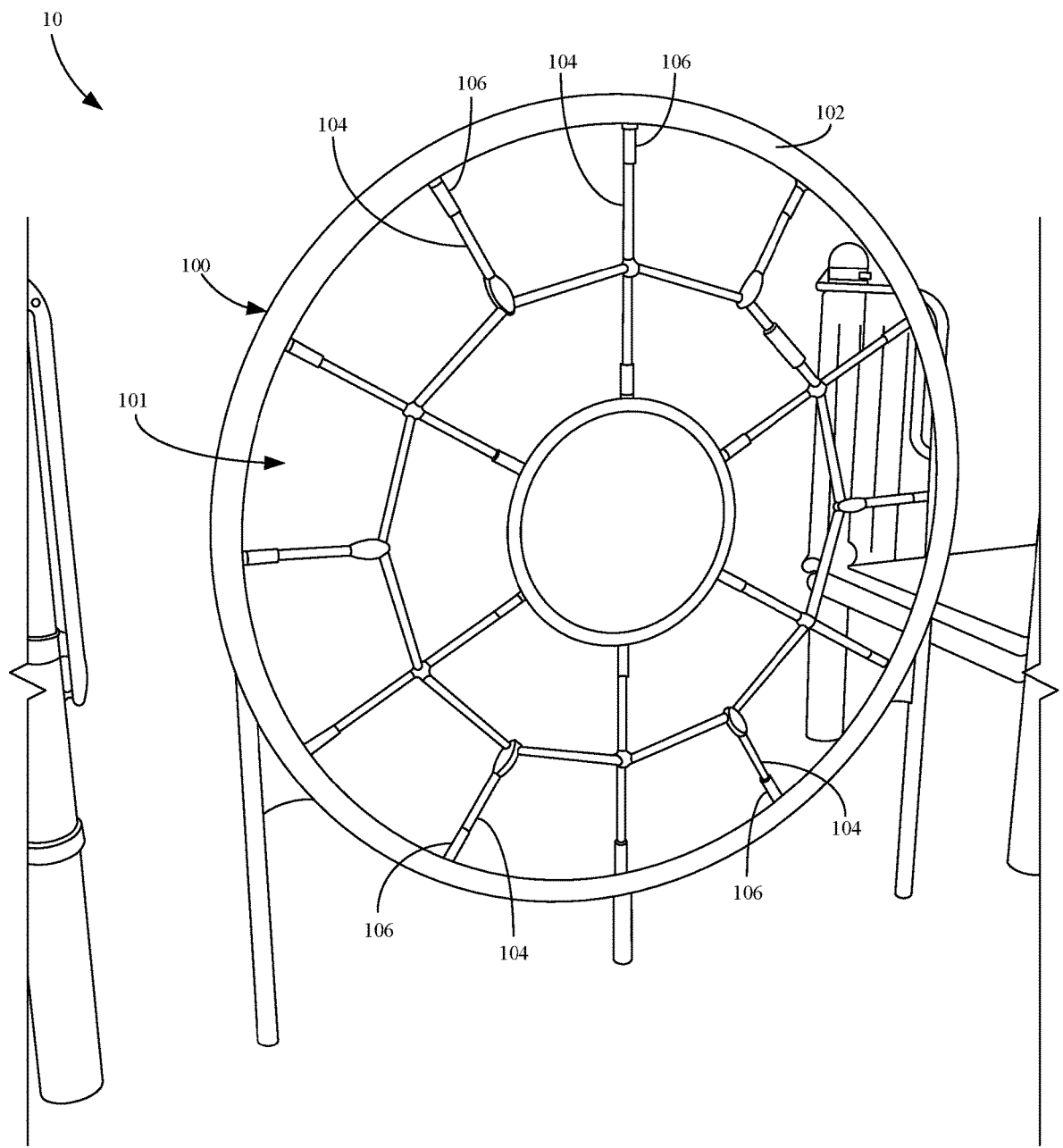
FIG. 1 is a perspective view showing an example play structure.

FIG. 1 is a perspective view showing an example play structure 100. Play structure 100 includes a rope web 101 coupled to a frame 102. Play structure 100 can be disposed in a play environment 10 that includes other items such as other play structures. Rope web 101 is coupled to frame 102 by tensioners 106 which couple to individual ropes 104 of rope web 101. When installing a rope, web 101 is useful to be able to tension variably tension the ropes 104 at various connection point along frame 102, such as tensioner 106. In some examples, all points where rope web 101 connects to frame 102, a tensioner 106 is used. In other examples, only some connections have tensioners 106.

Figure 2:
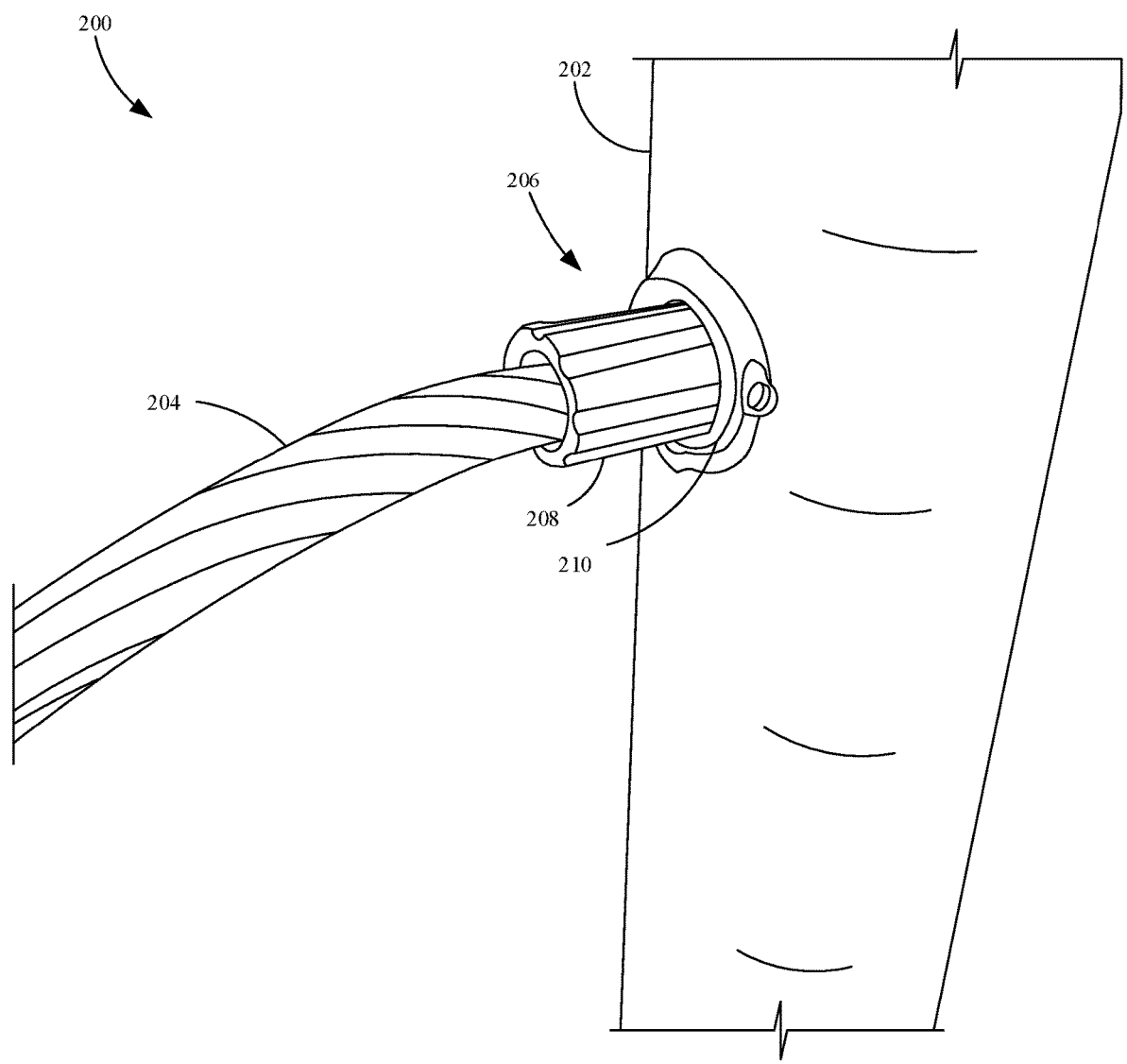
FIG. 2 is a perspective view showing an example interface.

FIG. 2 is a perspective view showing an example interface 200. Interface 200 includes frame 202, rope 204 and tensioning system 206. Tensioning system 206 includes a tensioner 208 and a collar 210. Collar 210 is coupled to frame 202 and, as shown, collar 210 does not move with respect to frame 202. Tensioner 208 is coupled to rope 204 and applies tension to rope 204 when actuated. Tensioner 208 can be tensioned by rotating tensioner 208 which engages a threaded connection between tensioner 208 and collar 210. The rotational movement of tensioner 208 translates into linear movement of tensioner 208 towards (or away from) frame 202. Since tensioner 208 is coupled to rope 204 movement of tensioner 208 causes an increase or decrease in tension of rope 204.

In other examples, collar 210 is coupled to frame 202 via a bearing, bushing or other mechanism which allows rotational movement with respect to frame 202. In such an example, rotational motion of collar 210 will translate into motion of linear motion of tensioner 208 and also increase of decrease tension in rope 204.

Figure 3:
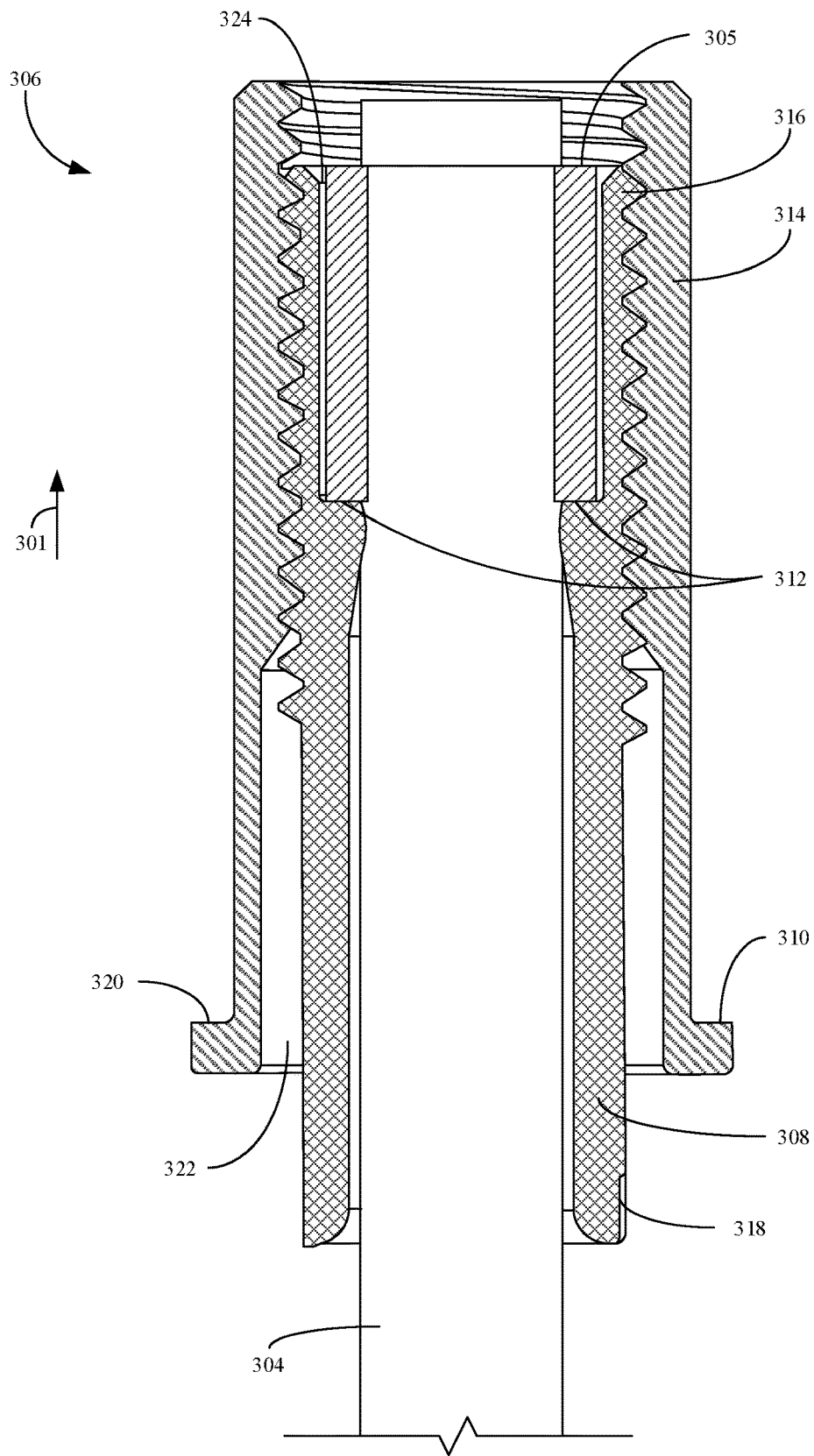
FIG. 3 is a sectional view showing an example tensioning system.

FIG. 3 is a sectional view showing an example tensioning system 306. Tensioning system 306 includes rope 304, tensioner 308, collar 310, and structure 311. Rope 304 is coupled to tensioner 308 via contact of rope end 305 on ledges 312. Rope end 305 fits within rope end aperture 324 but cannot be pulled through tensioner 308 as it is blocked by ledges 312. This way, when tensioner 308 moves in a direction indicated by arrow 301, rope 304 and rope end 305 do not pull through tensioner 308.

Tensioner 308 has a plurality of threads 316 which engage threads 314 of collar 310. Rotation of tensioner 308 translates into linear movement between threads 314 and 316 because an engagement. For additional tensioning, tensioner 308 includes tool engaging features 318. Tool engaging features 318 are configured to couple to a specific tool which allows for greater leverage and torque when rotating tensioner 308. In some examples, aperture 322 is wide enough that a tool engaging tool engaging feature 318 can countersink tensioner 308 within collar 310 (e.g., a portion of the tool can enter aperture 322, engage features 318 when tensioner 308 is fully disposed in collar 310).

Collar 310 can be coupled to a frame or other support structure to secure rope 304 indirectly to that structure. Collar 310 includes a ledge 320 which can allow for ease of coupling to a support structure. For example, the ledge can be welded to the structure. As another example, the ledge can include apertures that receive securing fasteners.

Figure 4:
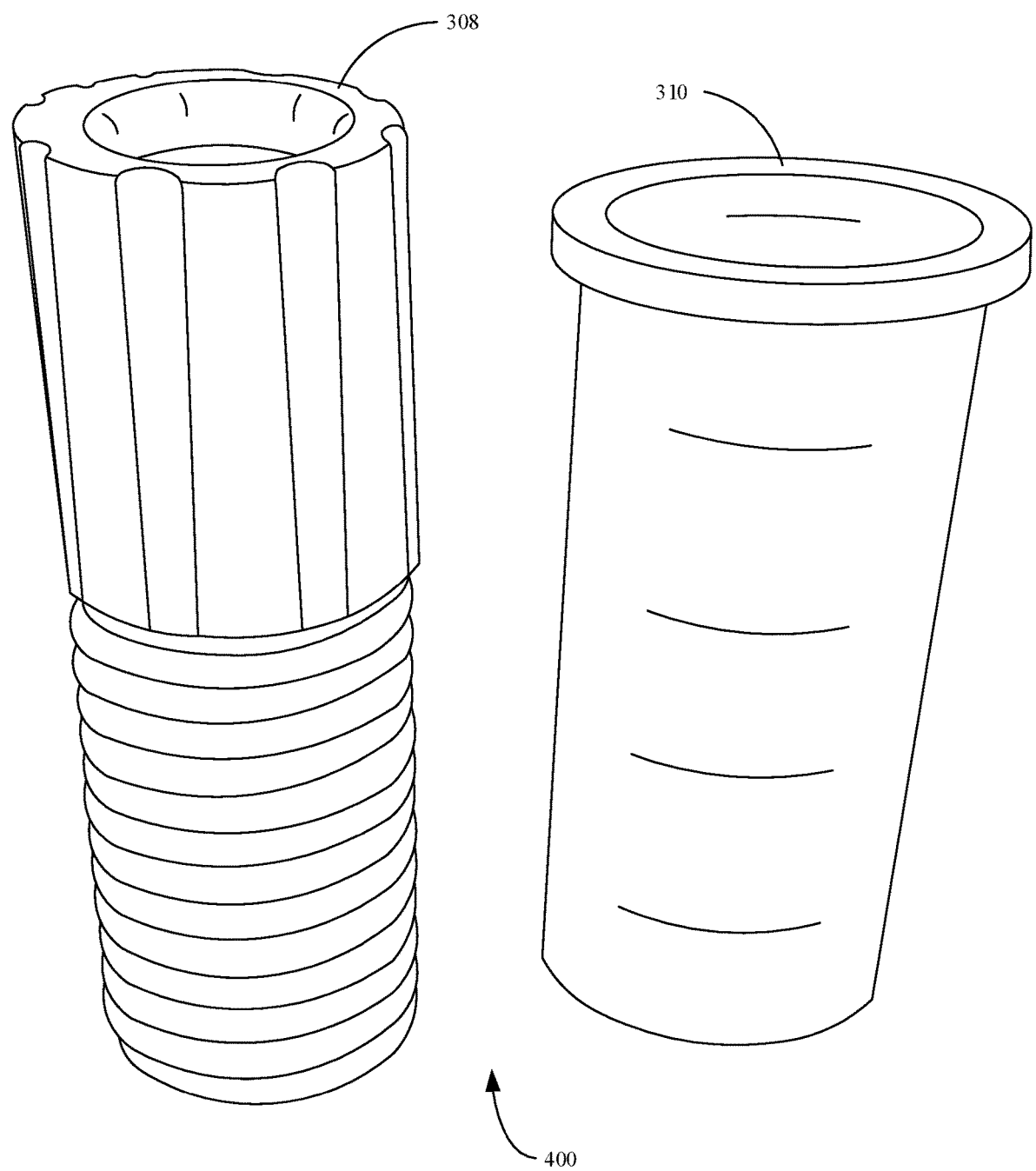
FIG. 4 is a perspective view showing example tensioning system components.

FIG. 4 is a perspective view 400 showing example tensioning system components. As shown, tensioner 408 has a plurality of tool engaging features 418 that are accessible when tensioner 408 is inserted within collar 410. Tensioner 408 also has a plurality of threads 416 that engage threads (which are not shown in FIG. 4) of collar 410.

Figure 5A:
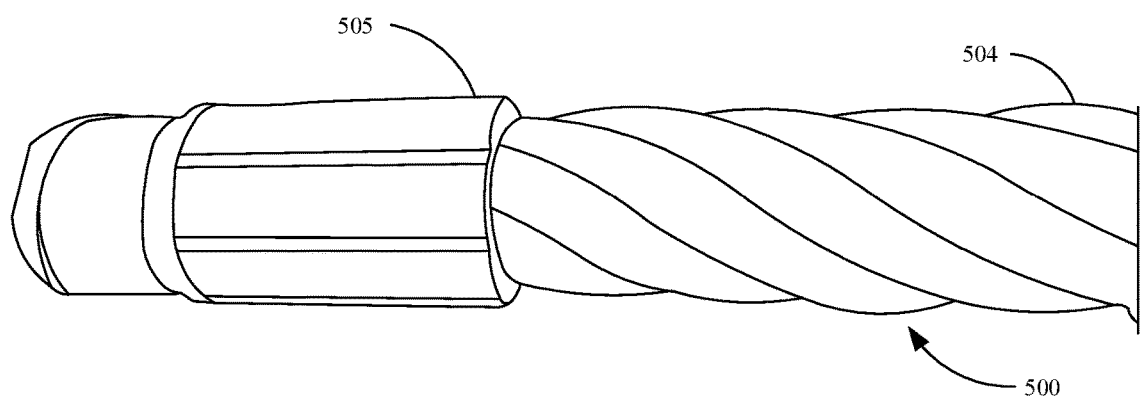
FIGS. 5A-5B are perspective views showing example rope configurations.
Figure 5B:
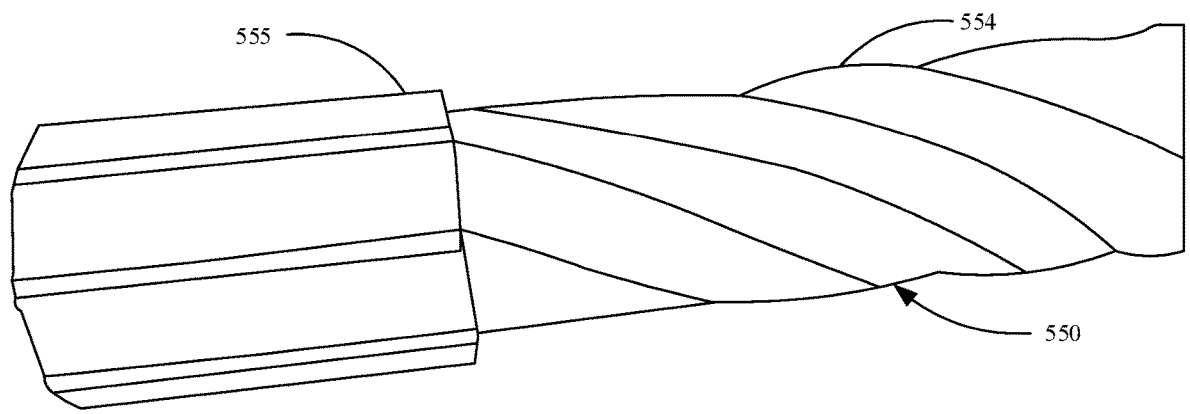

FIGS. 5A-5B are perspective views showing example rope configurations 500 and 550, respectively. Rope configuration 500 includes rope 504 and rope end 505, as shown, rope end 505 is a component that is pressed, crimped or otherwise attached to rope 504. Rope end 505 prevents rope 504 from being pulled through a given component (e.g., tensioner 308 of FIG. 3).

Rope configuration 550 includes rope 554 and rope end 555. As shown, rope end 555 is a component press fit or otherwise attached to the very end of rope 554. This rope configuration differs from that of FIG. 5A. Because rope end 555 is completely on the end of rope 554. In other examples, rope end 555 can be replaced by other items as well. For example, rope end 555 could be a knot tied in rope 554. In another example, rope and 555 could include an expanded or melted piece of rope 554 that is wider than the remainder of rope 554.

Figure 6:
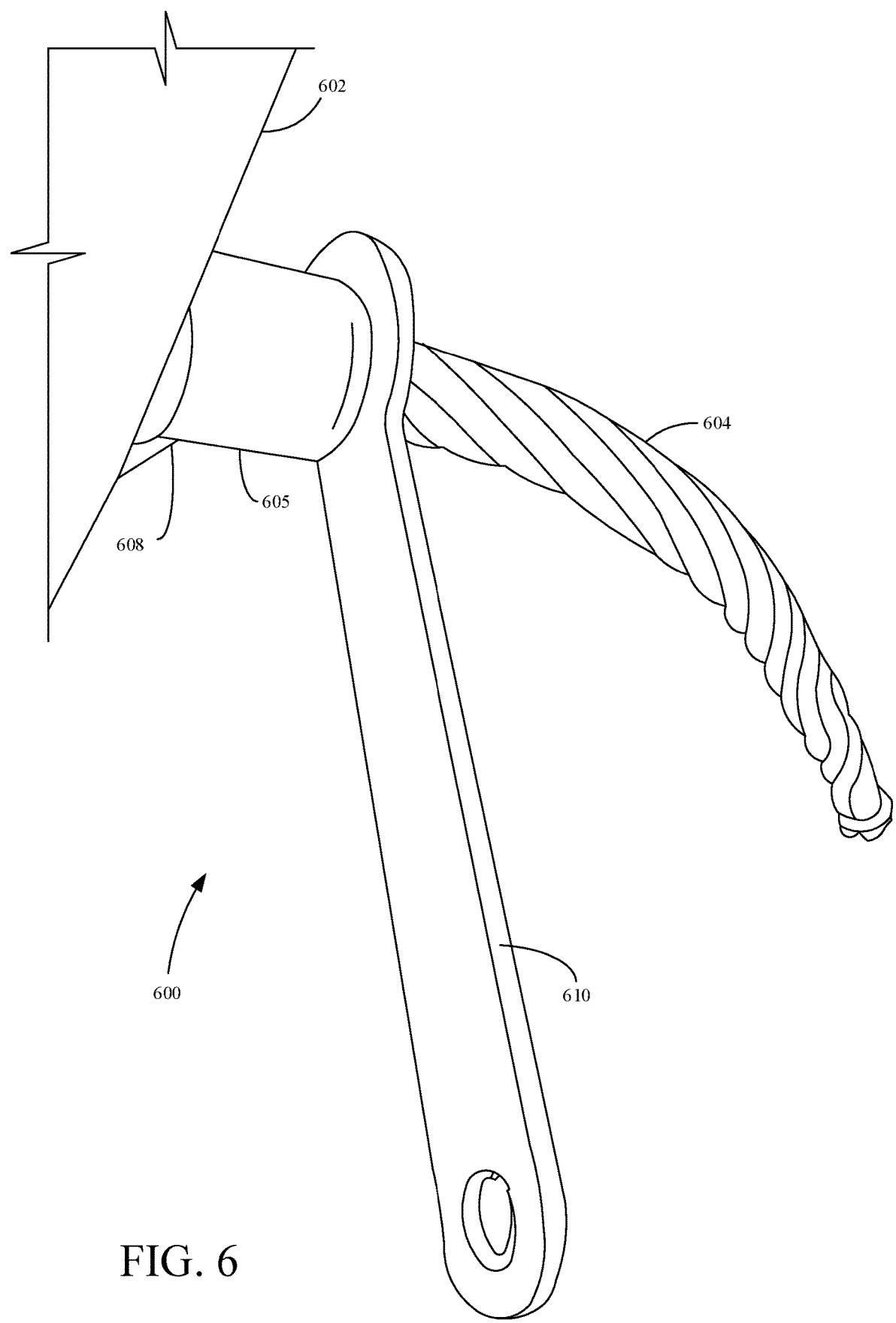
FIG. 6 is a perspective view showing an example rope coupling.

FIG. 6 is a perspective view showing an example rope coupling 600. Rope coupling 600 includes frame 602, rope 604, tensioner 605, collar 608, and tool 610. As shown, tool 610 is engaging tensioner 605. By torqueing tool 610 tensioner 605 is rotated which will translate into linear motion of tensioner 605 towards collar 608 and frame 602. When tensioner 605 is linearly actuated it also pulls rope 604 towards frame 602. Conversely, rotating tool 610 in the other direction will release tension on rope 604, by linearly actuating tensioner 605 away from frame 602.

Figure 7:
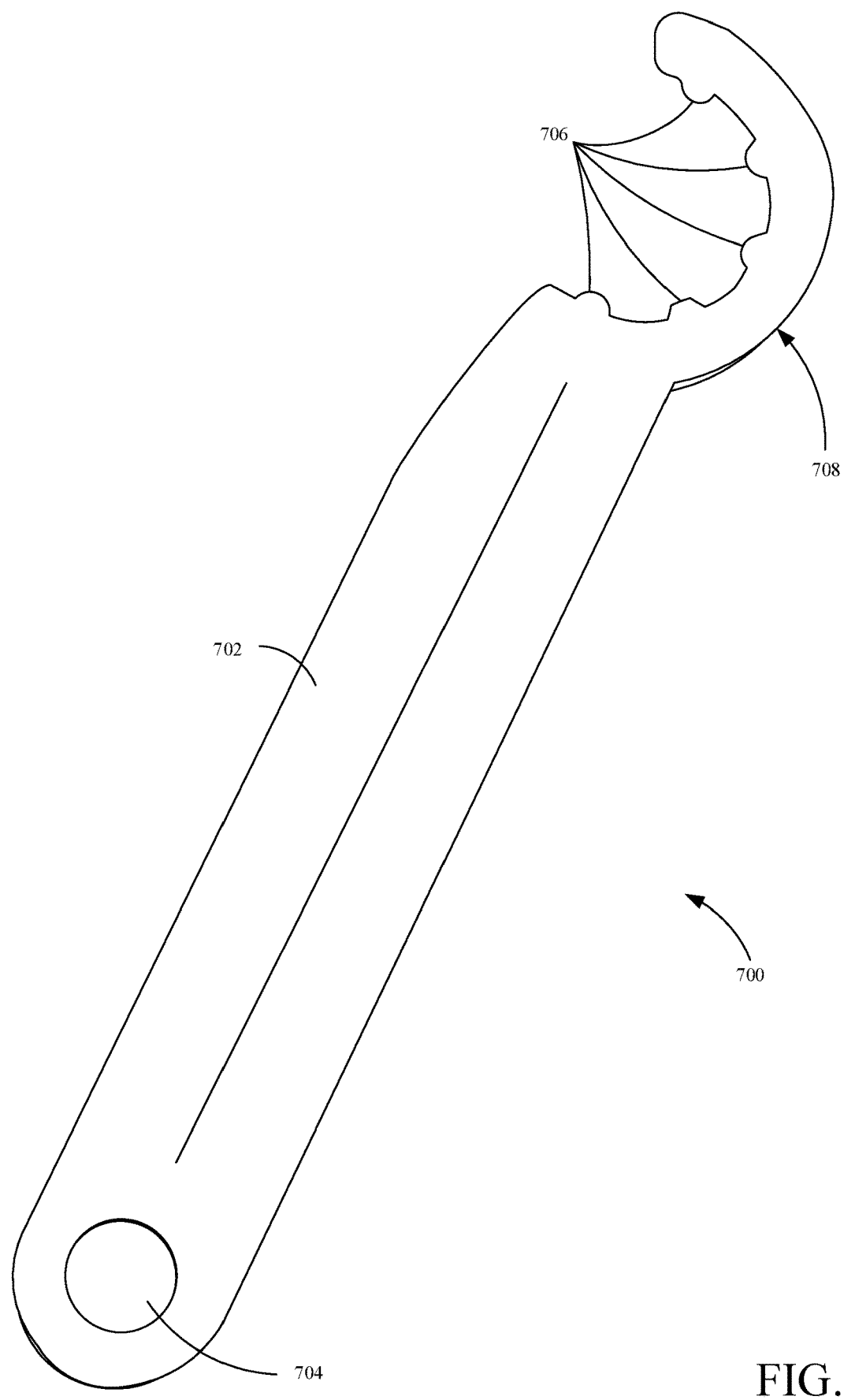
FIG. 7 is a top view showing an example tool.

FIG. 7 is a top view showing an example tool 700. As shown, tool 700 has a handle 702 for a user to grip and an aperture 704 for a user to hang or otherwise store tool 700. Tool 700 also includes a tensioner engaging end 708 including tensioner engagement elements 706. Tensioner engaging end 708 includes a semi-circle of tensioner engagement elements 706. A semi-circle allows tool 700 to be removed from the item that it is tensioning. In some examples, tensioner engagement elements 706 extrude away from a surface of the tool. In this example, tensioner engagement elements 706 can countersink a tensioner into a collar.

Figure 8A:
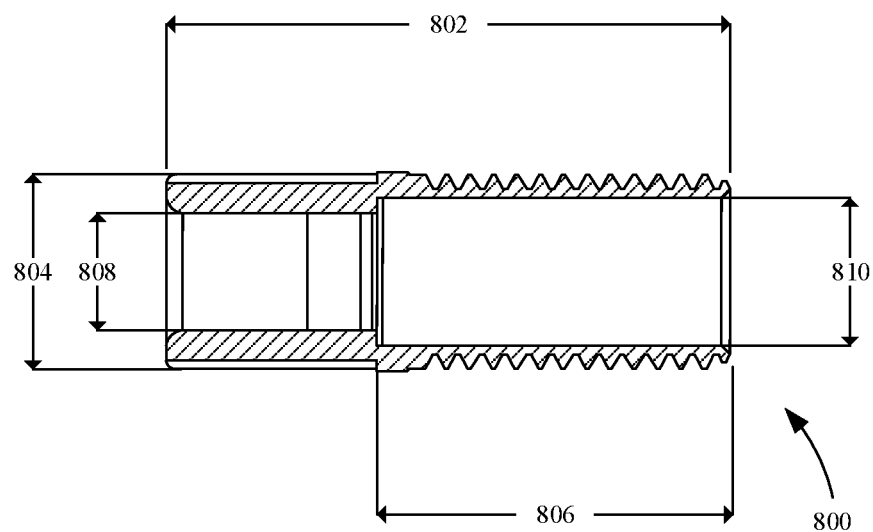
FIG. 8A is a schematic view showing a and example tensioner schematic.

FIG. 8A is a schematic view showing a and example tensioner 800. Tensioner 800 has a length 802. In one example, length 802 is approximately 4 inches. Tensioner 800 has a diameter 804. In one example, diameter 804 is approximately 1.4 inches. Tensioner 800 has a threaded section having a length 806. In one example, length 806 is approximately 2.5 inches. Tensioner 800 has a rope receiving aperture diameter 808. In one example diameter 808 is approximately 0.84 inches. Tensioner 800 has a rope end receiving aperture having a diameter 810. In one example, diameter 810 is approximately 1 inch.

Figure 8B:
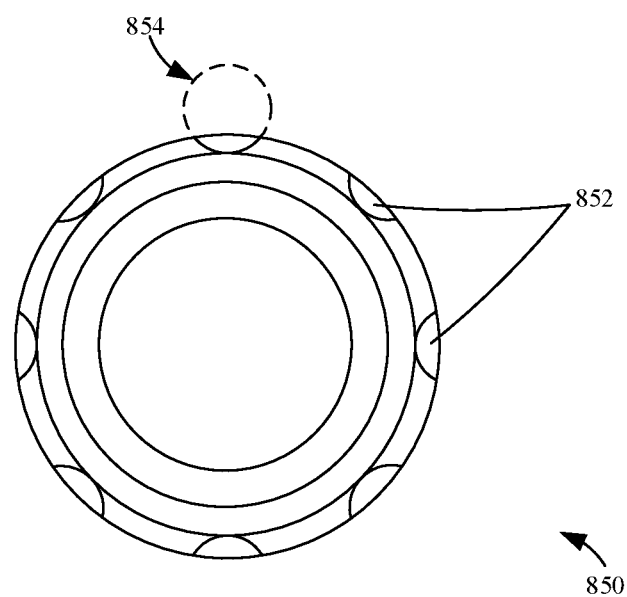
FIG. 8B is a schematic view showing an example tensioner schematic.

FIG. 8B is a schematic view showing an example tensioner schematic 850. Tensioner 850 includes a plurality of tool engaging elements 852. Tool engaging elements 852 are formed as recesses defined by semi-circles 854. In one example, semi-circles 854 have a diameter of approximately ¼ inch to 5/16 inches.

Figure 9:
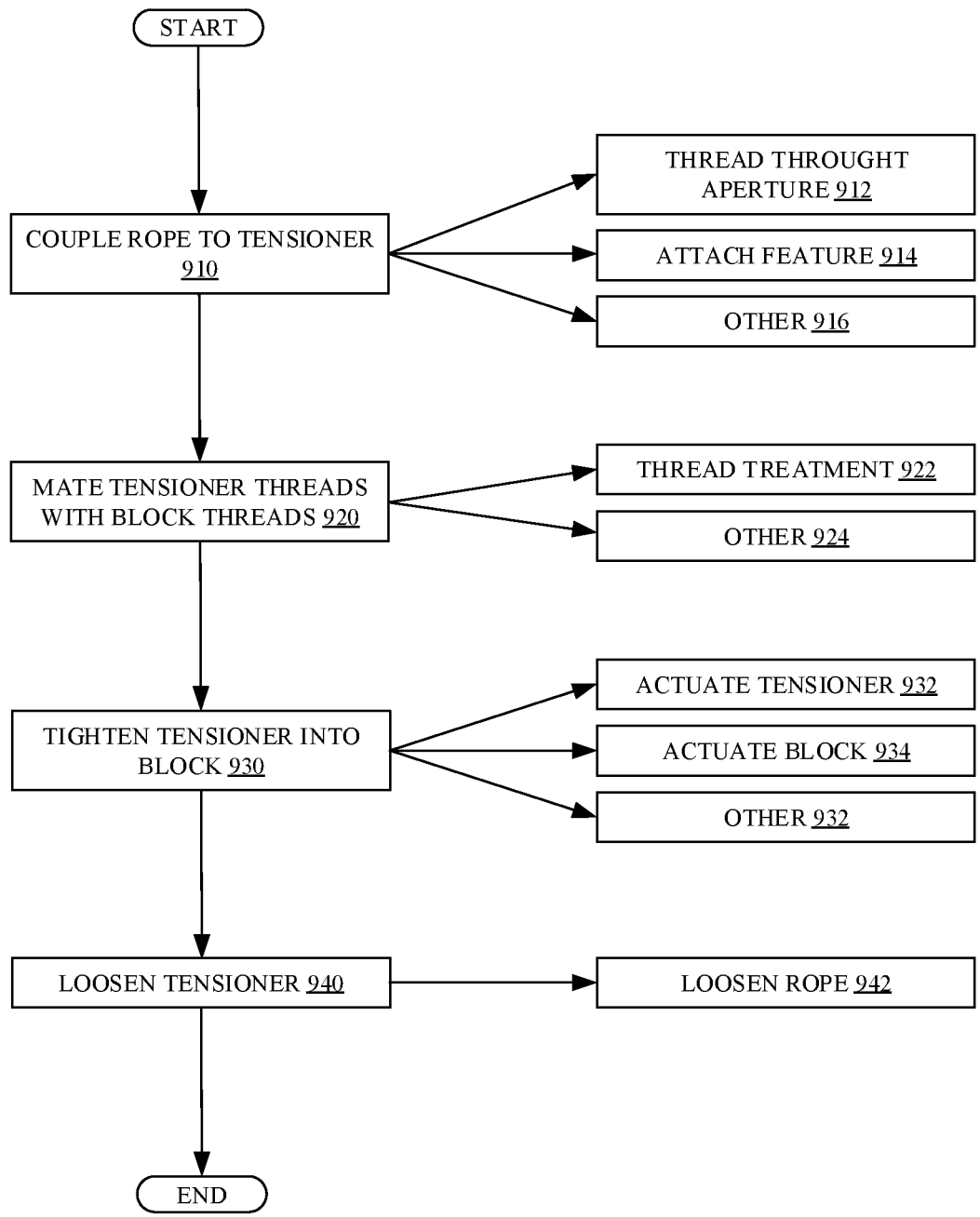
FIG. 9 is a flow diagram showing an example tensioning operation.

FIG. 9 is a flow diagram showing an example tensioning operation 900. Operation 900 begins at block 910 where the rope is coupled to a tensioner. Coupling the rope tensioner can include threading the rope through an aperture of tensioner, as indicated by block 912. Coupling the rope to tensioner can include attaching a rope end to the rope, as indicated by block 914. For example, by tying a knot in the rope or crimping a mechanism on the rope. Attaching a rope end to the rope will prevent the rope from pulling through a tensioner when the tensioner is linearly actuated. Coupling the rope to the tensioner can include other items as well, as indicated by block 916.

Operation 900 proceeds at block 920, where the tensioner threads are mated with the collar threads. Mating these threads can include in initial engagement between the threads such that rotation of one of the items will cause linear displacement between the two items.

Operation 900 proceeds at block 930 where the tensioner is linearly actuated relative to the collar. This linear actuation can be completed by actuating the tensioner, as indicated by block 932. For example, actuating the tensioner can include engaging a tool on the tensioner and rotating the tensioner. Linear actuation can be completed by actuating the collar, as indicated by the block 934. For example, the collar may allow for rotational actuation but not linear actuation such that rotation of the collar will cause linear movement of the tensioner and minimal to no linear movement of the collar. Linear actuation of the tensioner can be completed in other ways as well, as indicated by block 936.

Operation 900 proceeds at block 940 where the tensioner can optionally be loosened to reduce tension. Loosening tension on the rope can be completed in similar ways as tightening. For example, loosening may also require rotational actuation, but in the opposite direction of the rotational actuation used when tightening the rope. Loosening can be accomplished in other ways as well, as indicated by block 944.

Figure 10:
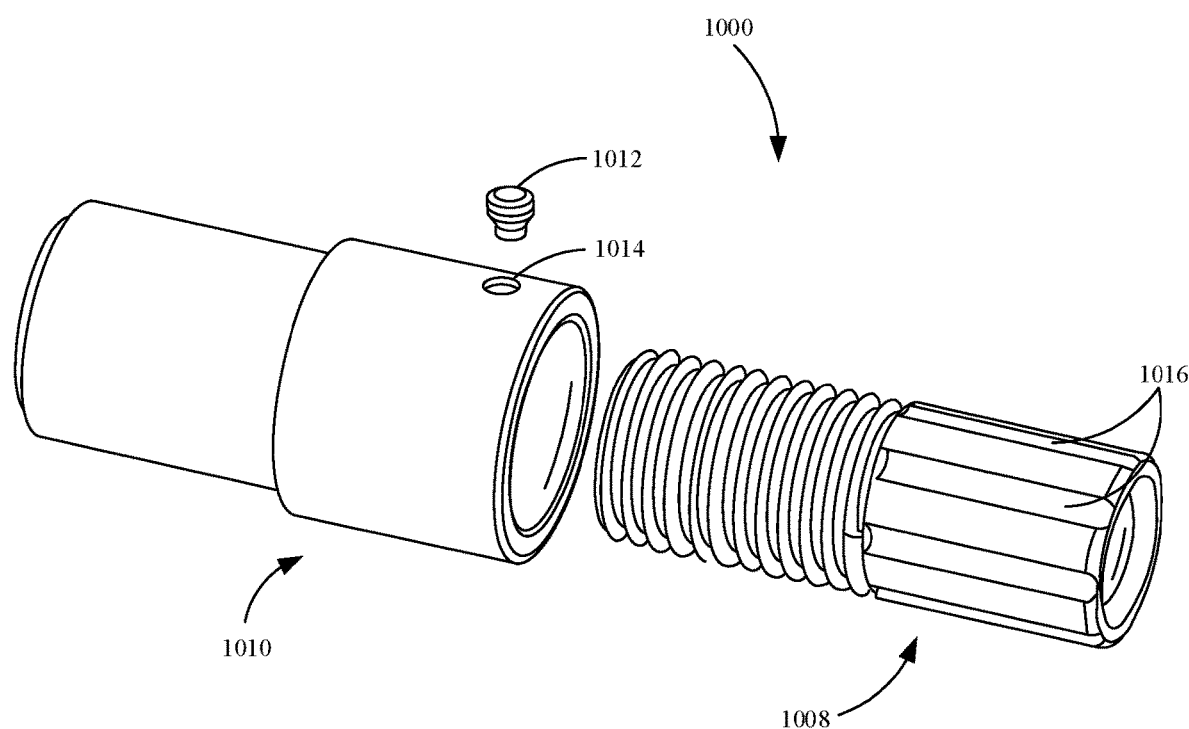
FIG. 10 is a perspective view showing an example tensioning system configuration.

FIG. 10 is a perspective view showing an example tensioning system configuration 1000. Configuration 1000 includes tensioner 1008 and collar 1010. Tensioner 1008 couples to collar 1010 in a threaded connection. To aide in torqueing tensioner 1008, tensioner 1008 has tool engaging elements 1016. Tool engaging elements 1016 can also be used to lock tensioner 1008 in rotational alignment with collar 1010. For example, collar 1010 has an aperture 1014 that receives a set screw 1012 that can engage the tool engaging elements 1016. Set screw 1012 is one example of a locking mechanism and other locking mechanisms may also be utilized.

Although the present invention has been described with reference to preferred embodiments, workers skilled in the art will recognize that changes may be made in form and detail without departing from the spirit and scope of the invention.

What is claimed is:

1. A rope tensioning system for use in a play environment, comprising:
   a play structure;
   a rope;
   a collar coupled to the play structure;
   a tensioner coupled to the rope, the tensioner comprising a plurality of tool engaging elements that are configured to be disposable in the collar, such that the tensioner can be actuated to a position flush with the collar;
   wherein the tensioner is coupled to the collar through a threaded connection; and
   wherein a rotation of the tensioner in relation to the collar adjusts a tension in the rope.

2. The system of claim 1, wherein the rope comprises a rope end that couples the rope to the tensioner.

3. The system of claim 2, wherein the rope end comprises a crimp connection.

4. The system of claim 2, wherein the tensioner comprises a ledge that receives the rope end.

5. The system of claim 1, wherein plurality of tool engaging elements are recessed deeper than threads on the tensioner, such that the plurality of tool engaging elements do not limit a depth of the threaded connection between the tensioner and collar.

6. The system of claim 5, wherein the plurality of tool engaging elements comprise semi-cylindrical indentations along an exterior surface of the tensioner.

7. The system of claim 1, wherein the collar is coupled to the play structure through a welded connection.

8. The system of claim 1, wherein the collar comprises a plurality of fastener apertures configured to receive fasteners that couple the collar to the play structure.

9. The system of claim 1, wherein the collar comprises a locking mechanism that prevents a rotation of the tensioner within the collar.

10. The system of claim 9, wherein the locking mechanism comprises a set screw that engages a tool engaging element of the tensioner.

11. A method for tensioning a rope, comprising:
coupling the rope to a tensioner;
mating a threaded portion of the tensioner to a threaded portion of a collar;
tightening a threaded connection of the tensioner and the collar; and
wherein the tightening of the threaded connection increases tension in the rope;
locking the tensioner to the collar; and
wherein locking the tensioner to the collar comprising actuating a set screw through the collar into a tool engaging element of the tensioner.

12. The method of claim 11, wherein coupling the rope to the tensioner comprises:
attaching a rope end to the rope; and
receiving the rope end with the tensioner.

13. The method of claim 11, wherein mating the threaded portion of the tensioner to the threaded portion of the collar comprising:
treating one of the threaded portions.

14. The method of claim 11, wherein tightening the threaded connection of the tensioner and the collar comprises:
countersinking the tensioner into the collar.

15. The method of claim 11, further comprising:
loosening the threaded connection of the tensioner and the collar; and
wherein the loosening of the threaded connection decreases tension in the rope.

16. A playground structure, comprising:
a frame;
a rope net;
a tensioning system configured to couple the rope net to the frame and tension at least a portion of the rope net, the tensioning system comprising:
a collar configured to couple to the frame;
a tensioner configured to couple to a rope of the rope net, the tensioner comprising:
a threaded portion;
a plurality of tool engaging elements that have a convex hull which fits within a helical shape defined by roots of the threaded portion; and
wherein the tensioner is configured to couple to the collar and when actuated, linearly displace relative to the collar.

17. The playground structure of claim 16, wherein plurality of recessed tool engaging elements comprise semi-cylindrical indentations along an exterior surface of the tensioner.

* * * * *